(12) United States Patent
Nandakumar et al.

(10) Patent No.: US 11,915,349 B1
(45) Date of Patent: Feb. 27, 2024

(54) EXTRUSION TECHNIQUE FOR CURVE RENDERING

(71) Applicant: Apple Inc., Cupertino, CA (US)

(72) Inventors: Nitin Nandakumar, Sunnyvale, CA (US); Tobias Eble, Sunnyvale, CA (US); Shenyao Ke, Fremont, CA (US)

( * ) Notice: Subject to any disclaimer, the term of this patent is extended or adjusted under 35 U.S.C. 154(b) by 178 days.

(21) Appl. No.: 17/694,959

(22) Filed: Mar. 15, 2022

Related U.S. Application Data

(60) Provisional application No. 63/162,604, filed on Mar. 18, 2021.

(51) Int. Cl.
| | |
|---|---|
| *G06T 11/40* | (2006.01) |
| *G06T 1/20* | (2006.01) |
| *G06T 7/50* | (2017.01) |
| *G06T 7/64* | (2017.01) |
| *G06T 7/73* | (2017.01) |

(52) U.S. Cl.
CPC ............. *G06T 11/40* (2013.01); *G06T 1/20* (2013.01); *G06T 7/50* (2017.01); *G06T 7/64* (2017.01); *G06T 7/73* (2017.01); *G06T 2200/12* (2013.01); *G06T 2200/28* (2013.01)

(58) Field of Classification Search
CPC ... G06T 11/40; G06T 1/20; G06T 7/50; G06T 7/64; G06T 7/73; G06T 2200/12; G06T 2200/28
See application file for complete search history.

(56) References Cited

U.S. PATENT DOCUMENTS

| | | | | |
|---|---|---|---|---|
| 7,868,887 B1* | 1/2011 | Yhann | ................... | G06T 11/203 345/442 |
| 8,044,955 B1* | 10/2011 | Yhann | ..................... | G06T 17/20 345/419 |
| 8,068,106 B1* | 11/2011 | Yhann | ..................... | G06T 11/20 345/442 |
| 2017/0270710 A1* | 9/2017 | Beri | ........................ | G06T 11/40 |
| 2018/0033168 A1* | 2/2018 | Beri | ....................... | G06T 3/4084 |

FOREIGN PATENT DOCUMENTS

CN 107492065 A * 12/2017 ............... G06T 1/20

* cited by examiner

*Primary Examiner* — Ryan R Yang (74) *Attorney, Agent, or Firm* — Thompson Hine LLP (57) ABSTRACT

Various implementations disclosed herein interpret data that define curves to display the curves in a 2D or 3D environment. In some implementations, vertices are used to represent control points that specify the geometry of a curve. These vertices are changed in an extrusion process that moves and/or adds vertices to ensure that sufficient pixels are available for anti-aliasing during rasterization, while also providing changed vertices that can be interpreted to accurately render the curve's geometry.

20 Claims, 5 Drawing Sheets

EXTRUSION TECHNIQUE FOR CURVE RENDERING

CROSS-REFERENCE TO RELATED APPLICATIONS

This application claims the benefit of U.S. Provisional Application Ser. No. 63/162,604 filed Mar. 18, 2021, which is incorporated herein in its entirety.

TECHNICAL FIELD

This disclosure generally relates to electronic devices that provide views of content, and in particular, to systems, methods, and devices for providing views of electronic content that include text, glyphs, and other items that include curves.

BACKGROUND

Rasterization process are employed to convert electronic content described in primitives (e.g., triangles or other vector graphic shapes having vertices) into a raster image of pixel values. Rasterization may involve anti-aliasing that smooths the appearance of shape edges, e.g., selecting pixel values around edges to reduce abrupt changes or jagged appearances. Existing anti-aliasing techniques may fail to provide adequate results with respect to curves. Curves may be rasterized by interpreting the vertices of a primitive (e.g., a triangle) as the control points of a Bezier curve and selecting pixel values accordingly, e.g., using a signed distance value test. However, rasterization pipelines may include components (e.g., a rasterizer with hardware-fixed, non-customizable functionality) that provide access to an insufficient set of pixels for which values can be specified for a given curve. The inability to access and thus change the appearance of a sufficient set of pixels may hinder anti-aliasing techniques that might otherwise be used to smooth the appearance curve edges.

SUMMARY

Various implementations disclosed herein include devices, systems, and methods that interpret data that defines curves to display the curves in a 2D or 3D environment. In some implementations, vertices are used to represent control points that specify the geometry of a curve. For example, a Bezier curve may have a geometry defined by interpreting control points using de Casteljau's Algorithm. These vertices are changed in an extrusion process that moves and/or adds vertices to ensure that sufficient pixels are available for anti-aliasing during rasterization, while also providing changed vertices that can be interpreted to accurately render the curve's geometry.

A rasterization pipeline may include a component such as a rasterizer having hardware-fixed, non-customizable functionality. Given a set of control points defining a curve, such a component may provide access to a limited set of pixels for rendering the curve that is insufficient for an anti-aliasing or other rendering function. Using an extrusion process to move and/or add vertices can ensure that the component provides access to a set of pixels sufficient for anti-aliasing or otherwise rendering the curve.

Once a sufficient set of pixels is available, the extruded vertices are interpreted to render the curve using the set of pixels. This may involve using a technique that allows any arbitrary curve to be represented by any arbitrary set of vertices. Thus, even though the vertices are extruded, the extruded vertices can still represent the position and shape of the curve.

In some implementations, a rasterization pipeline include (a) a vertex shader that identifies screen space positions of vertices and performs vertex extrusion via a software customization, (b) a fixed (i.e., non-software customizable) rasterizer that identifies fragments for the shape based on the extruded vertices' screen space positions, and (c) a fragment shader that interprets the extruded vertices to return pixel values for the identified fragments according to a transform that enables a curve (e.g., a Bezier curve) to be determined from the extruded vertices according to a software customization. The fragment shader may perform anti-aliasing better because it has more fragments/pixels (as identified by the rasterizer using the extruded vertices) than would have been identified using the original vertices.

One exemplary method is performed by an electronic device executing instructions to perform operations. The operations include determining a first set of vertices representing a curve, where the first set of vertices correspond to a first area of rasterization window space. This may involve preprocessing on a CPU to generate a path outline, identify convex Bezier curves, fill polygons, and concave Bezier curves which provide vertices (i.e., a triangulation) that is provided to a GPU. This may further involve a vertex-to-rasterization window space mapping performed by standard vertex shader functionality of a GPU.

The method determines a second set of vertices representing the curve, for example, via an extrusion process. The second set of vertices corresponding to a second area of the rasterization window space that is larger than the first area. This may be performed by software implemented to augment a vertex shader's or similar component's standard functionality. Determining the second set of vertices may involve changing the position of vertices and/or adding vertices in rasterization window space. Changing vertices in rasterization window space as opposed to model space may help ensure uniform extrusion and ultimately better anti-aliasing and rendering results.

The method identifies fragments (i.e., pixels which might appear on the screen if not blocked) based on the second set of vertices representing the curve. This may be performed by a rasterizer or similar fixed component of a rasterization pipeline that cannot be customized by software. The method generates an image depicting the curve, the image having pixel values for at least some of the identified fragments. To do so, the second set of vertices are interpreted to provide a position and geometry of the curve. The pixel values are thus determined based on the position and shape of the curve, which is understood based on the second set of points. This image generation may be performed by a fragment shader of a GPU, which may include software implemented to augment standard fragment shader or similar functions to identify the curve's position based on extruded vertex positions and perform anti-aliasing.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory, computer-readable storage medium stores instructions, which, when executed by one or more processors of a device, cause the device to perform or cause performance of any of the methods described herein. In accordance with some implementations, a device includes one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
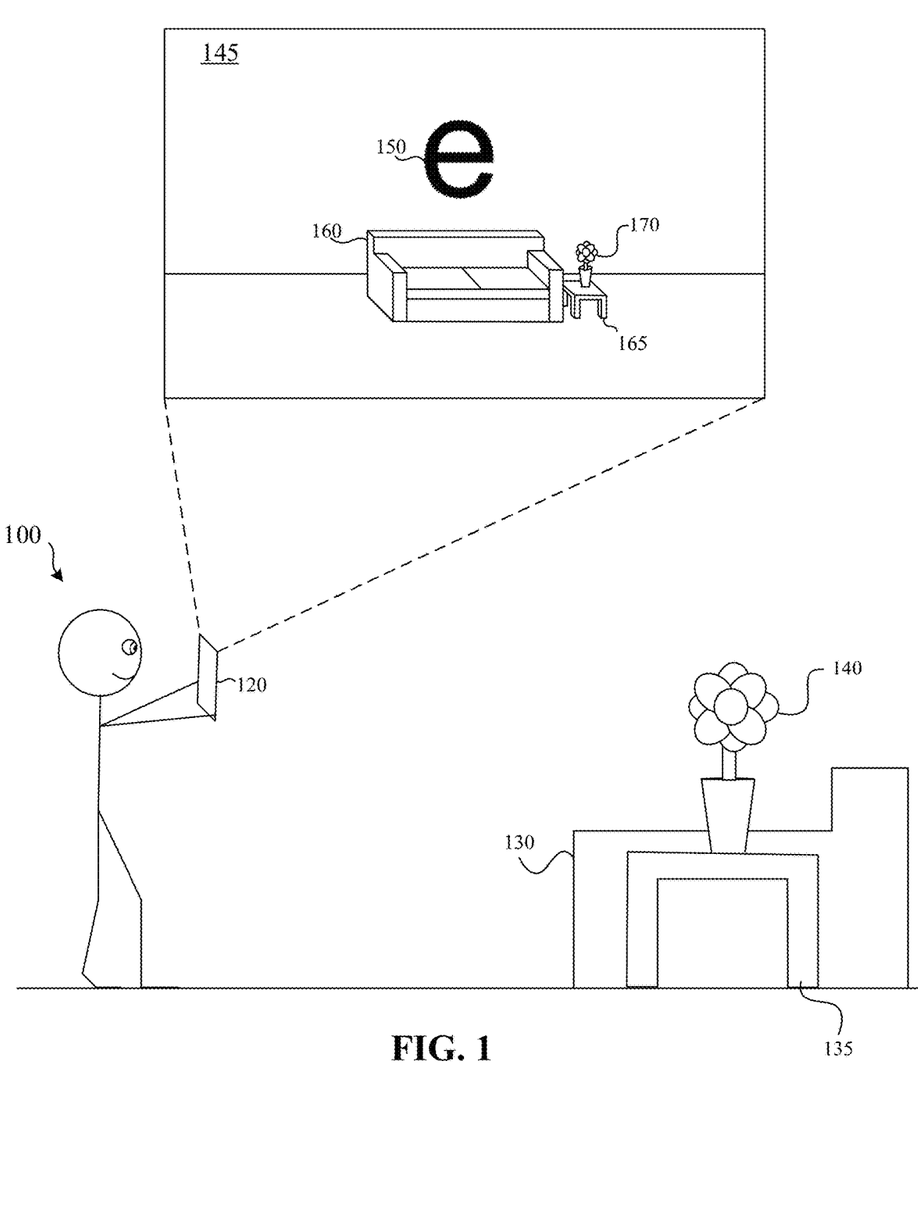
FIG. 1 illustrates an example of an electronic device being used in a physical environment in accordance with some implementations.

FIG. 1 illustrates an example physical environment 100 (e.g., a room) including a device 120. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell. In this example, the physical environment includes a sofa 130, an end table 135, and a flower in a vase 140.

In some implementations, the device 120 displays content 145 to a user. For example, content 145 may include a user interface icon, a text box, a graphic, an avatar of the user or another user, and/or views of an environment such as an extended reality (XR) environment that may be based at least in part on the physical environment 100. In this example, the content 145 includes a view of an XR environment that includes the physical environment 100 (e.g., a depiction 160 of the couch 130, a depiction 165 of the end table 135, and a depiction 170 of the flower in a vase 140) and added text 150, including a rendering of a glyph of a lowercase letter "e".

To provide content 145, the device 120 obtains image data, motion data, and/or other data corresponding to the physical environment 100 via a plurality of sensors. For example, one or more image sensors on the device 120 may obtain images of the physical environment 100. In another example, one or more depth sensors on the device 120 obtain depth data, such as depth images, of the physical environment 100. The device 120 positions the text 150 at a fixed position relative to the physical environment. In other words, as the user moves around the physical environment and views content representing the XR environment from different positions, the text 150 retains its relative position to the physical environment, e.g., the text 150 maintains its position above the depiction 160 of the sofa 130.

In some implementations, as illustrated in FIG. 1, the device 120 is a handheld electronic device (e.g., a smartphone or a tablet). In some implementations the device 120 is a laptop computer or a desktop computer. In some implementations, the device 120 has a touchpad and, in some implementations, the device 120 has a touch-sensitive display (also known as a "touch screen" or "touch screen display"). In some implementations, the device 120 is a wearable device such as a head mounted device (HMD). While this example and other examples discussed herein illustrate a single device 120 in the physical environment 100, the techniques disclosed herein are applicable to multiple devices as well as to other environments. For example, the functions of device 120 may be performed by multiple devices, using the displays, sensors, or other components on each respective device, or divided among them in any combination.

Figure 2:
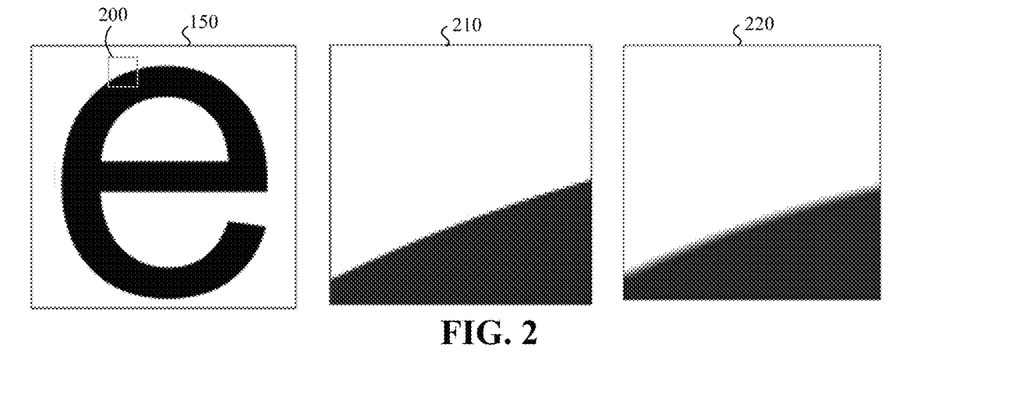
FIG. 2 illustrates rendering a text object including curves with and without anti-aliasing in accordance with some implementations.

FIG. 2 illustrates rendering a text object 150 including curves with and without anti-aliasing in accordance with some implementations. View 210 illustrates a rendering of portion 200 of the text object 150 in which anti-aliasing has not been performed. In contrast, view 220 illustrates a rendering of portion 200 of the text object 150 in which anti-aliasing has been performed. As depicted, the anti-aliasing provides a smoother appearance for edge portions of the curve 200.

Figure 3:
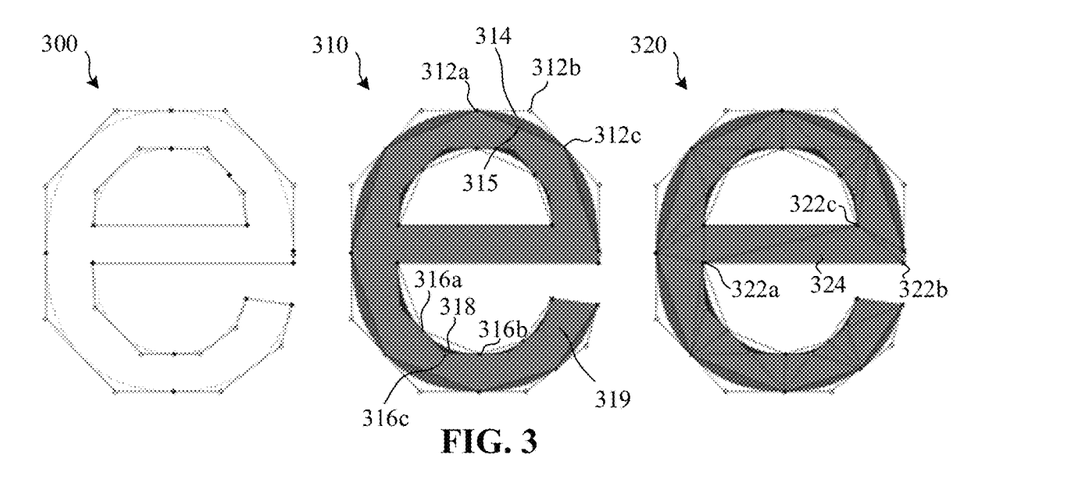
FIG. 3 illustrates generating a triangulation of control points representing the text object of FIG. 2 in accordance with some implementations.

FIG. 3 illustrates generating control points (i.e., a triangulation) representing the text object 150 of FIG. 2. In this example, path outline 300 is created. Path outline 300 may be created based on a definition of text object 150. For example, text object 150 may be defined or represented as a vector graphic. Text object 150 may be defined or represented using one or more curves (e.g., Bezier curves) that have associated control points. Text object 150 may be defined or represented using convex Bezier curves and concave Bezier curves as illustrated in representation 310. For example, control points 312a-c define convex Bezier curve 314. These control points further define an area defined by convex Bezier curve 314 and base line 315 between control point 312a and control point 312b.

The remaining interior portion of the representation 310 (i.e., not including the shapes formed by the convex and concave Bezier curves and base lines) is a fill polygon 319. The final triangulation 320 triangulates the interior of the fill polygon 319 into triangular portions using the control points of the Bezier curves. For example, control points 322a-c define a triangle 324 representing one triangular portion within the fill polygon 319. The final triangulation 320 thus provides vertices that provide control points for (a) convex Bezier curves, (b) concave Bezier curves, and (c) triangular portions of the interior of fill polygon 319. Note that interior portions may be shrunken to avoid overlap with extruded outer portions. The final triangulation (i.e., the vertices) may be provided for rendering the text object 150.

In some implementations a rendering pipeline uses specialized and specific processes for rendering each of the portions having curved outer edges, portions having straight outer edges, and inner portions (i.e., triangles) of a text object 150. In some implementations, the outer portions are rendered using extrusion processes that ensures that sufficient pixels are available for rendering (e.g., anti-aliasing or otherwise), while also ensuring that the geometry of the text object 150 is accurately rendered.

Figure 4:
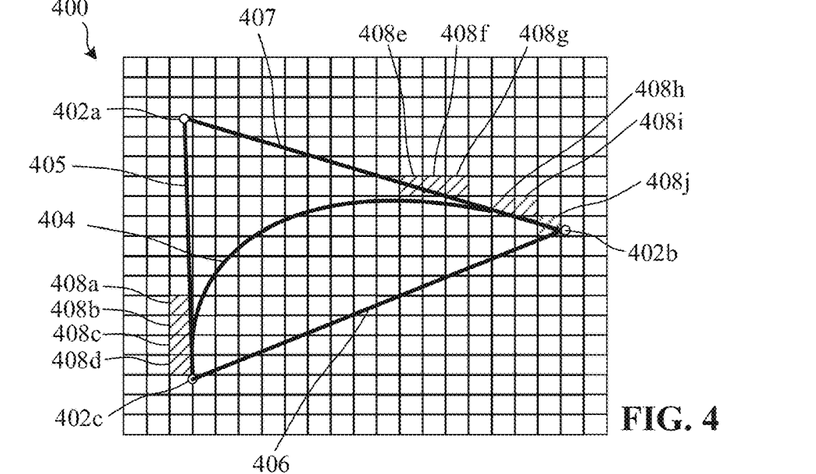
FIG. 4 illustrates using vertices representing control points that define a curve to select fragments for rendering a shape where the selection makes some relevant pixels unavailable for the rendering.

FIG. 4 illustrates using vertices 402a-c representing control points that define a curve 404 to select fragments that will be available for rendering a shape (e.g., a text object or portion thereof). The term "fragment" refers to the data necessary to generate a single pixel's worth of a drawing primitive in a frame buffer. Each fragment corresponds to a pixel which might have an appearance on the screen based on the curve 404 if not blocked, for example, by another object. Accordingly, selecting which fragments will be available for rendering a shape affects which pixels will be available and thus whether sufficient pixels will be available to satisfy anti-aliasing and other rendering requirements. In the example of FIG. 4, the selection fails to identify some fragments/pixels that are relevant to providing anti-aliasing or other rendering requirements.

In the example of FIG. 4, fragments of a rasterization window space 400 are identified as available for rendering the shape. In the example, the shape is defined by vertices 402a-c and includes the area within curve 404 and straight base line 406. The vertices 402a-c define a triangle 407 that is used to identify which fragments/pixels of the rasterization window space 400 are available for rendering the shape. For example, any fragment/pixel having a center point that that falls within the triangle 407 may be included in the set of fragments (and corresponding pixels) available for rendering the shape. It may not be possible to use a custom software component to change the criteria used to select which fragments/pixels will be identified as available. For example, the control points represented by vertices 402a-c may be provided to a component (e.g. a GPU rasterizer of a rasterization pipeline) that does not allow software customization to change fragment selection criteria. This lack of ability to control fragment/pixel selection criteria may result in selection of a set of fragments/pixels for rendering that does not include fragments/pixels needed for anti-aliasing or other rendering requirements. In this example, fragments 408a-j (and corresponding pixels) are not included in the set of fragments/pixels available for rendering the shape even though one or more of these fragments/pixels 408a-j may be needed to satisfy anti-aliasing or other rendering requirements.

Figure 5:
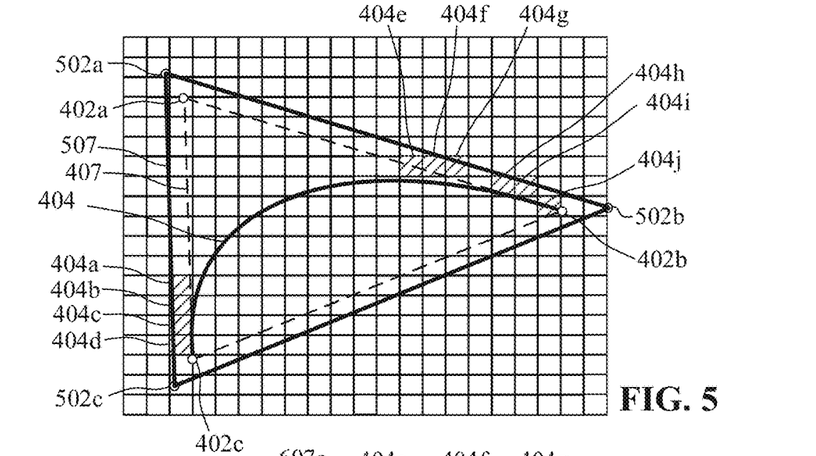
FIG. 5 illustrates a first example of extruding the vertices of FIG. 4 to select fragments for rendering a shape according to some implementations.

FIG. 5 illustrates a first example of extruding the vertices of the shape of FIG. 4 to select fragments/pixels for rendering a shape according to some implementations. Specifically, vertex 402a is moved to be vertex 502a, vertex 402b is moved to be vertex 502b, and vertex 402c is moved to be vertex 502c. The amount of extrusion/movement of the vertices may be selected based on the requirements of the anti-aliasing or other rendering requirements. The amount of extrusion/movement may be customized by software. In some implementations, the thickness of the extrusion is uniform in rasterization window space (as opposed to in model or world space). In various examples, the amount of extrusion is selected to provide a one pixel increase in width along one or more edges of the shape, a 2.3 pixel increase in width along one or more edges of the shape, a three pixel increase in width along one or more edges of the shape, etc. In some implementations, the extrusion of the shape is not symmetric—some edges may be extended more than other edges, and some edges may not be extruded at all. In some implementations, only outer edges are extruded and interior edges are not extruded.

The extruded vertices 502a-c form triangle 507, which is larger than the triangle 407 formed by the original vertices 402a-c. The extruded vertices 502a-c define triangle 507 that is used to identify which fragments/pixels of the rasterization window space 400 are available for rendering the shape. For example, any fragment/pixel having a center point that that falls within the triangle 507 is included in the set of fragments (and corresponding pixels) available for rendering the shape. Because of the larger size of triangle 507 (relative to triangle 407), fragments/pixels 408a-j are included in the set of fragments/pixels selected to be available for rendering the shape. Accordingly, the set of fragments/pixels is sufficient to satisfy anti-aliasing or other rendering requirements.

The extruded vertices 502a-c may be used in rendering the shape using the available pixels. For example, a transform or other mathematical relationship may be used to interpret the positions of the vertices to generate the geometry of the curve 404. In some implementations, a method of representing any arbitrary curve using any arbitrary triangle is used. This may involve remapping the canonical uv coordinates of a triangle using the barycentric coordinates of the input triangle vertices. This allows extrusion of vertices, e.g., triangle to larger triangle or triangle to pentagon, while still enabling the shading of the original shape of the curve within the geometry.

In some implementations, control points of a quadratic Bezier curve are mapped to extruded vertices. Perspective-correct interpolation may be accomplished by assigning canonical [u,v] coordinates to the vertices. After extrusion, a processor (e.g., a GPU) may perform perspective-correct interpolation of these [u,v] coordinates and provide the resulting [u,v] values to a shader (e.g., a fragment shader). However, when the vertices are extruded, another process may be performed for the perspective-correct interpolation, e.g., rather than using the GPU rasterizer. For example, the following process performs perspective-correct interpolation using canonical [u,v] coordinates for an extruded vertex. In the case of a triangle, such a process may be repeated three times, once for each of the vertices. In one example, canonical [u,v] coordinates are used for each input vertex of Bezier triangle: tex1=[0,0], tex2=[0.5,0] and tex3=[1,1]. The barycentric coordinates are computed for each of the extruded vertex positions with respect to the original input Bezier triangle. A "cartesianToBary(P, A, B, C)" function is used to compute the barycentric coordinates, using the areal coordinate formula. "P" represents an extruded vertex position in rasterization window space. "A", "B" and "C" represent input vertex positions of the Bezier triangle in the rasterization window space. For triangle "ABC", and new extruded point "P", barycentric coordinates are computed as follows:

bary1=Area of Triangle *CAP*/Area of Triangle *ABC* bary2=Area of Triangle *ABP*/Area of Triangle *ABC* bary3=1−bary1−bary2

The canonical [u,v] coordinates are interpolated with the barycentric coordinates to form the new [u,v] coordinate, as follows: bary[u,v]=bary1×tex1+bary2×tex2+bary3×tex3. Further interpolation (e.g., via a GPU rasterizer) on these [u,v] coordinates may be prevented, for example, by specifying a qualifier, e.g., a "center noperspective" attribute for the variable that is output from the vertex shader and input to the fragment shader in the Metal shading language.

Figure 6:
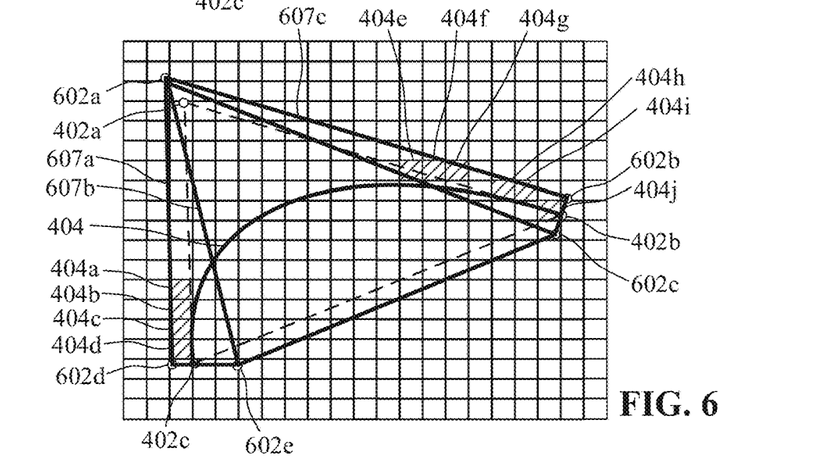
FIG. 6 illustrates a second example of extruding the vertices of FIG. 4 to select fragments for rendering a shape according to some implementations.

FIG. 6 illustrates a second example of extruding the vertices of FIG. 4 to select fragments/pixels for rendering a shape according to some implementations. Specifically, vertex 402*a* is moved to be vertex 602*a*, vertex 402*b* is replaced with vertex 602*b* and vertex 602*c*, and vertex 402*c* is replaced with vertex 602*d* and 602*e*. The extruded vertices 602*b*, 602*c* are positioned on a line perpendicular to the end of curve 404 at vertex 402*b*. In other words, the extrusion happens in both directions of the vertex normal. This may allow, for example, a coverage filter in a fragment shader to have uniformly-spaced samples for inside-outside testing. Similarly, the extruded vertices 602*d*, 602*e* are positioned on a line perpendicular to the end of curve 404 at vertex 402*c*. As in the example of FIG. 5, the amount of extrusion/movement of the vertices may be selected based on the requirements of the anti-aliasing or other rendering requirements. In some implementations, the thickness of the extrusion is uniform in rasterization window space (as opposed to in model or world space).

The extruded vertices 602*a-e* form three triangles 607*a-c*: triangle 607*a* is formed by vertices 602*a*, 602*d*, and 602*e*, triangle 607*b* is formed by vertices 602*a*, 602*e*, and 602*c*, and triangle 607*c* is formed by vertices 602*a*, 602*c*, and 602*b*. The three triangles 607*a-c* form an area which is larger than the triangle 407 formed by the original vertices 402*a-c*. The triangles 607*a-c* defined by extruded vertices 602*a-e* may be used to identify which fragments/pixels of the rasterization window space 400 are available for rendering the shape. Any fragment/pixel having a center point that that falls within one of the triangles 607*a-c* is included in the set of fragments (and corresponding pixels) available for rendering the shape. Because of the larger size relative to triangle 407, fragments/pixels 408*a-j* are included in the set of fragments/pixels selected to be available for rendering the shape. Accordingly, the set of fragments/pixels is sufficient to satisfy anti-aliasing or other rendering requirements.

The extruded vertices 602*a-e* may be used in rendering the shape using the available pixels. For example, a transform or other mathematical relationship may be used to interpret the positions of the vertices to generate the geometry of the curve 404. Each grouping of three vertices (i.e., corresponding to triangles 607*a-c*) can be used to identify a corresponding portion of the curve 404. In some implementations, a method of representing any arbitrary curve using any arbitrary triangle is used. This may involve remapping the canonical uv coordinates of a triangle using the barycentric coordinates of the input triangle vertices. This allows extrusion of vertices, e.g., triangle to larger triangle or triangle to pentagon, while still enabling the shading of the original shape of the curve within the geometry.

In another example, returning to FIG. 3, an extrusion technique is used to facilitate anti-aliasing or other rendering requirements for a portion of a triangulation having a straight outer edge. For example, the vertices 322*a-b* may be extruded to provide access to more fragments/pixels in rendering the shape 324 defined by vertices 322*a-c*, including any anti-aliasing or other rendering effects used along the outer edge between vertices 322*a-b*.

Figure 7:
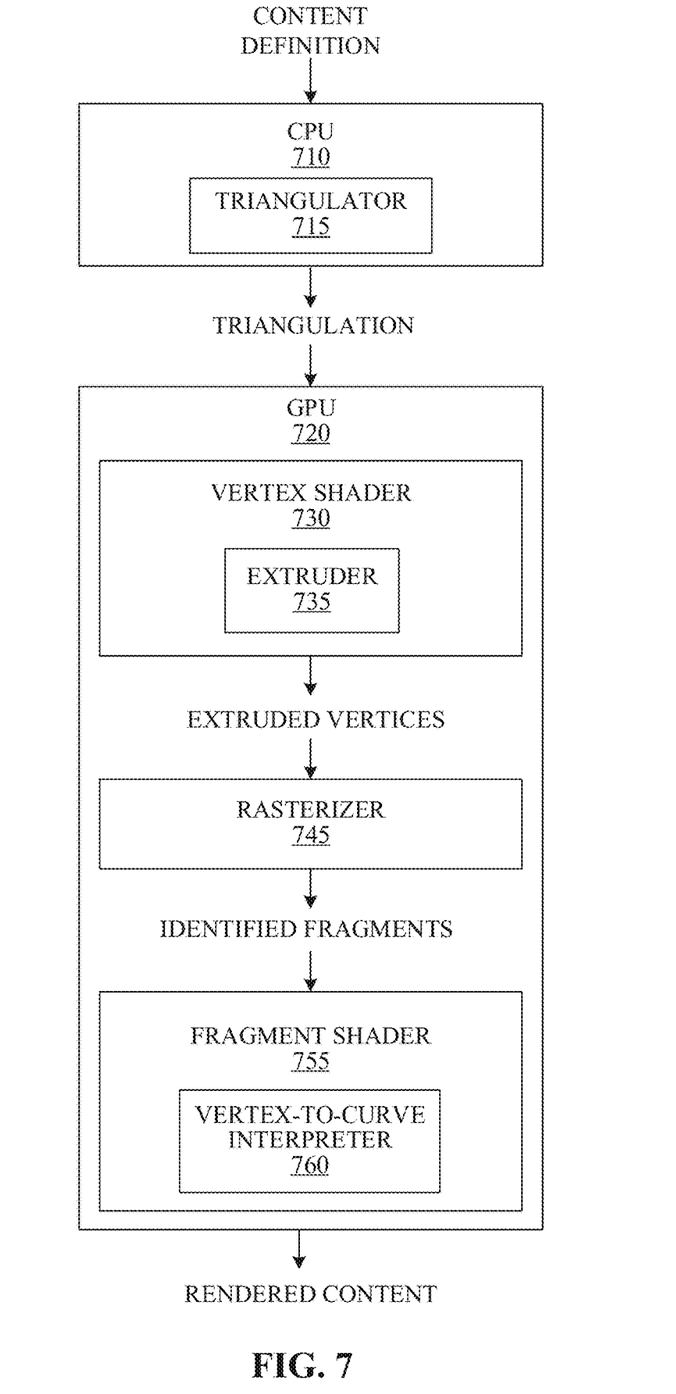
FIG. 7 is a flowchart representation of a method of rendering a curve using CPU and GPU components in accordance with some implementations.

FIG. 7 is a flowchart representation of a method 700 of rendering a curve using CPU and GPU components in accordance with some implementations. In this example, a content definition (e.g., defining text or other shape) is processed by CPU 710. The CPU 710 includes a triangulator 715 that uses the content definition to provide a triangulation. An example of producing a triangulation was discussed above with respect to FIG. 3. In some implementations, triangulator 715 is a custom software component executed by CPU 710. The triangulation may include vertices that define triangles corresponding to interior or exterior portions of a shape. The triangulation may include vertices that define triangular portions and/or that define control points that specify portions of the shape having curved edges.

The triangulation is processed by GPU 720. GPU 720 includes a vertex shader 730 that includes an extruder 735. The extruder 735 changes the triangulation, for example, by moving or adding vertices to produce extruded vertices. FIGS. 4-6 illustrate examples of extruding vertices to change one portion of a triangulation. Similar extrusions may be performed for multiple portions of a triangulation. In some implementations, the type of extrusion and/or whether a portion is extruded depends on whether the portion includes an outer edge or not or whether the portion includes a curved outer edge or not. In some implementations, different extrusion techniques are used for different types of portions of the triangulation.

The extruded vertices from extruder 735 are assessed by a rasterizer 745 of the GPU 720 to identify fragments (and thus corresponding pixels) for use in rendering the corresponding portion of the shape. The use of extruded vertices may facilitate the inclusion of sufficient identified fragments for one or more anti-aliasing or rendering purposes. The identified fragments and extruded vertices are provided to the fragment shader 755, which includes a vertex-to-curve interpreter 760. The vertex-to-curve interpreter 760 uses the extruded vertices to specify the appearance of pixels associated with the identified fragments according to the geometry of the shape identified from the extruded vertices. The resulting appearance provides rendered content, e.g., content that may be viewed using one or more display screens of an electronic device.

Figure 8:
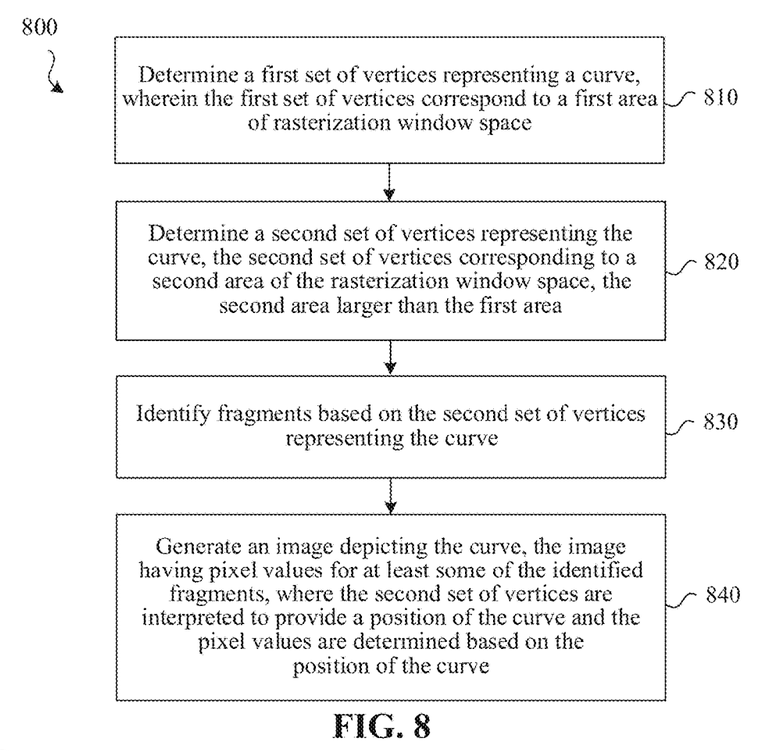
FIG. 8 is a flowchart representation of a method of rendering a curve in accordance with some implementations.

FIG. 8 is a flowchart representation of a method 800 of rendering a curve. In some implementations, the method 800 is performed by a device 120, such as a mobile device, desktop, laptop, HMD, or server device. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 determines a first set of vertices representing a curve, where the first set of vertices correspond to a first area of rasterization window space. This may involve preprocessing on a CPU to generate a path outline, identify convex Bezier curves, fill polygons, and concave Bezier curves which provide vertices (i.e., a triangulation) that is provided to a GPU as illustrated in FIG. 3. This may further involve a vertex-to-rasterization window space mapping, which may be performed by the standard vertex shader functionality of a GPU.

At block 820, the method 800 determines a second set of vertices representing the curve, the second set of vertices corresponding to a second area of the rasterization window space, the second area larger than the first area. The second set of vertices may be determined via an extrusion process. The second set of vertices may be determined by software implemented to augment a vertex shader's standard functionality as illustrated in FIG. 7. In some implementations, the second set of vertices is determined in rasterization window space as illustrated in FIGS. 5-6 to help ensure uniform extrusion thickness. In some implementations, the second set of vertices is determined by moving a vertex of the first set of vertices in rasterization window space as illustrated in FIG. 5. In some implementations, the second set of vertices comprises adding a vertex to the first set of vertices as illustrated in FIG. 6. In some implementations, the second set of vertices is determined by extruding a vertex in both directions of a normal direction. This may enable uniform spacing, e.g., allowing a coverage filter in a fragment shader to have uniformly-spaced samples for inside-outside testing. In some implementations, the second set of vertices is determined by adding vertices to the first set of vertices to form a pentagon. In some implementations, sets of extruded vertices of adjacent curves are extruded without generating overlapping shapes.

In some implementations, extrusion is performed dynamically. In some implementations, extrusions performed dynamically based on screen size. Extrusion may be performed to minimize the extra area created to reduce the amount of rasterized pixels while being sufficient in size to support aliasing. In one circumstance (e.g., a given zoom level), the extrusion may dynamically be selected to be a few pixels. In another circumstance (e.g., after zooming in), the extrusion can be dynamically selected to have a fewer pixels. In another circumstance (e.g., after zooming out), the extrusion can be dynamically selected to have more pixels. Dynamic extrusion may be facilitated by storing the extruded vertices (e.g., the second set of vertices) with the extrusion normal and then transforming them into screen space (along with Bezier (u,v)s), for example, using a vertex shader.

At block 830, the method 800 identifies fragments (corresponding to pixels which might be given an appearance on a display based on the curve if not blocked) based on the second set of vertices representing the curve. This identification may be performed by a rasterizer or other component of a GPU as described in FIG. 7. Such a component may be a fixed component of a rasterization pipeline that cannot be customized by software.

At block 840, the method 800 generates an image depicting the curve, the image having pixel values for at least some of the identified fragments, where the second set of vertices are interpreted to provide a position of the curve and the pixel values are determined based on the position of the curve. This image generation may be performed by a GPU component, e.g., by the fragment shader 755 of FIG. 7. Software (e.g., vertex-to-curve interpreter 760) may be implemented to augment standard fragment shader 755 functions to identify the curve's position based on extruded vertex positions and perform anti-aliasing or other rendering functions. In some implementations, the image further comprises selecting the pixel values based on an anti-aliasing filter or anti-aliasing criteria.

In some implementations, the second set of vertices are interpreted to provide the position and shape of the curve. This may involve interpreting the second set of vertices by applying a transform to transform the second set of vertices into a set of control points representing the position and shape of the curve.

Different processes (e.g., rasterization processes) may be used to rasterize different portions of a shape. For example, portions having straight outside edges, portions having curved outside edges, and portions having no outside edges (i.e., inner portions) may be rasterized using different techniques.

The image generated depicting the curve may be depicted within a 2D or 3D environment. In some implementations, rendering a curve according to the techniques disclosed herein is provided in the context of providing a view of a 3D environment. This may involve providing a view of an XR environment, for example, a view that includes a virtual object positioned amongst real and virtual objects. Thus, in some implementations, a curve is depicted in one or more images that provide one or more views of an extended reality (XR) environment. In contrast to a physical environment, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual Objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual Objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 9:
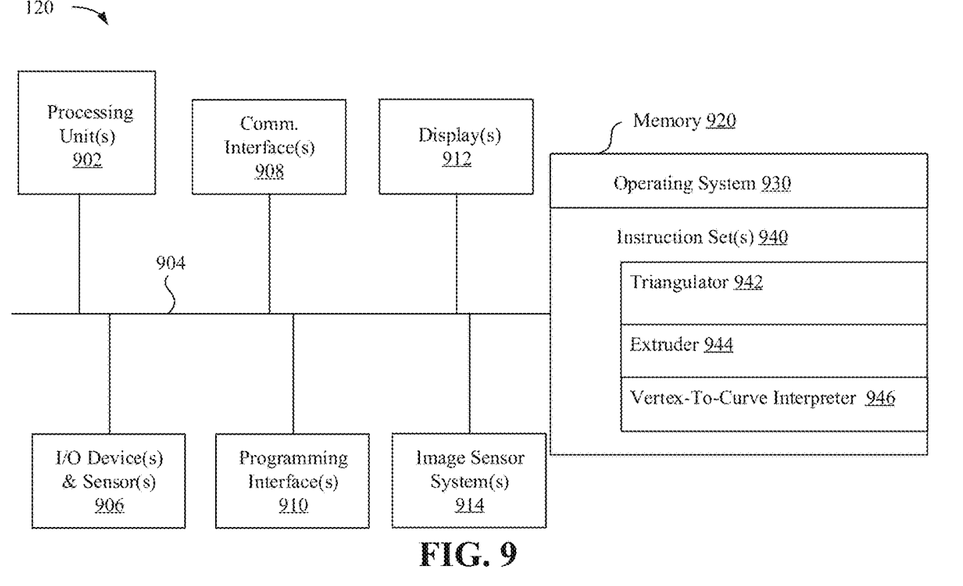
FIG. 9 is a block diagram illustrating exemplary components of a device configured in accordance with some implementations.

FIG. 9 is a block diagram illustrating exemplary components of the device 120 configured in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 910, one or more displays 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 912 are configured to present a view of a physical environment or a graphical environment (e.g. a 3D environment) to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 912 correspond to diffractive, reflective, polarized, holographic, etc. waveguide displays. In one example, the device 120 includes a single display. In another example, the device 120 includes a display for each eye of the user.

In some implementations, the one or more image sensor systems 914 are configured to obtain image data that corresponds to at least a portion of the physical environment 100. For example, the one or more image sensor systems 914 include one or more RGB cameras (e.g., with a complimentary metal-oxide-semiconductor (CMOS) image sensor or a charge-coupled device (CCD) image sensor), monochrome cameras, IR cameras, depth cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include a triangulator 942, an extruder 944, and a vertex-to-curve interpreter 946. The instruction set(s) 940 may be embodied a single software executable or multiple software executables.

In some implementations, the triangulator 942 is executable by the processing unit(s) 902 (e.g. a CPU) to generate triangulation of vertices that define one or more triangles corresponding to curves or other shapes as disclosed herein. To these ends, in various implementations, it includes instructions and/or logic therefor, and heuristics and metadata therefor.

In some implementations, the extruder 944 is executable by the processing unit(s) 902 (e.g., a GPU) to extrude one or more portions of a triangulation or other representation of a shape. To these ends, in various implementations, it includes instructions and/or logic therefor, and heuristics and metadata therefor.

In some implementations, the vertex-to-curve interpreter 946 is executable by the processing unit(s) 902 (e.g., a GPU) to generate an image of a curve based, for example, an vertices and/or extruded vertices that can be interpreted as control points of a Bezier curve or other shape. To these ends, in various implementations, it includes instructions and/or logic therefor, and heuristics and metadata therefor.

Although the instruction set(s) 940 are shown as residing on a single device, it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first surface could be termed a second surface, and, similarly, a second surface could be termed a first surface, without changing the meaning of the description, so long as all occurrences of the "first surface" are renamed consistently and all occurrences of the "second surface" are renamed consistently. The first surface and the second surface are both surfaces, but they are not the same surface.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device:
   determining a first set of vertices representing a curve, wherein the first set of vertices correspond to a first area of rasterization window space;
   determining a second set of vertices representing the curve, the second set of vertices corresponding to a second area of the rasterization window space, the second area larger than the first area;
   identifying fragments based on the second set of vertices representing the curve; and
   generating an image depicting the curve, the image comprising pixel values for at least some of the identified fragments, wherein the second set of vertices are interpreted to provide a position of the curve and the pixel values are determined based on the position of the curve.

2. The method of claim 1, wherein determining the second set of vertices comprises moving a vertex of the first set of vertices in rasterization window space.

3. The method of claim 1, wherein determining the second set of vertices comprises adding a vertex to the first set of vertices.

4. The method of claim 1, wherein determining the second set of vertices comprises extruding a vertex of the vertices in both directions of a normal direction.

5. The method of claim 1, wherein determining the second set of vertices comprises adding vertices to the first set of vertices to form a pentagon.

6. The method of claim 1, wherein the second set of vertices is determined based on a display size.

7. The method of claim 1, wherein sets of vertices of adjacent curves are extruded without generating overlapping shapes.

8. The method of claim 1, wherein the second set of vertices are interpreted to provide the position and shape of the curve.

9. The method of claim 1, wherein the second set of vertices are interpreted by applying a transform to transform the second set of vertices into a set of control points representing the position and shape of the curve.

10. The method of claim 1, wherein generating the image further comprises selecting the pixel values based on an anti-aliasing filter or anti-aliasing criteria.

11. The method of claim 1, wherein determining the first set of vertices comprise, at a central processing unit:
    generating a path outline of a glyph;
    identifying a Bezier curve based on the path outline; and
    providing the first set of vertices corresponding to control points of the Bezier curve.

12. The method of claim 11 further comprising identifying convex Bezier curves, fill polygons, and concave Bezier curves representing the path outline of the glyph.

13. The method of claim 11, wherein different rasterization processes are used to rasterize inner and outer curves of the glyph.

14. The method of claim 1, wherein determining the first set of vertices comprises performing a vertex-to-rasterization window space mapping via a vertex shader functionality of a graphics processing unit.

15. The method of claim 1, wherein determining the second set of vertices is implemented via software implemented via a vertex shader.

16. The method of claim 1, wherein the fragments correspond to pixels which might appear on the screen if not blocked.

17. The method of claim 1, wherein the fragments are identified by a rasterizer having hardware-fixed functionality.

18. A system comprising:
a device with one or more graphics processing units (GPUs); and
a memory including instructions that, when executed by the one or more GPUs, cause the system to perform operations comprising:
   determining a first set of vertices representing a curve, wherein the first set of vertices correspond to a first area of rasterization window space;
   determining a second set of vertices representing the curve, the second set of vertices corresponding to a second area of the rasterization window space, the second area larger than the first area;
   identifying fragments based on the second set of vertices representing the curve; and
   generating an image depicting the curve, the image comprising pixel values for at least some of the identified fragments, wherein the second set of vertices are interpreted to provide a position of the curve and the pixel values are determined based on the position of the curve.

19. The system of claim 18, wherein determining the second set of vertices comprises moving a vertex of the first set of vertices in rasterization window space.

20. A non-transitory computer-readable medium storing program instructions executable via one or more graphics processing units (GPUs) to perform operations comprising:
   determining a first set of vertices representing a curve, wherein the first set of vertices correspond to a first area of rasterization window space;
   determining a second set of vertices representing the curve, the second set of vertices corresponding to a second area of the rasterization window space, the second area larger than the first area;
   identifying fragments based on the second set of vertices representing the curve; and
   generating an image depicting the curve, the image comprising pixel values for at least some of the identified fragments, wherein the second set of vertices are interpreted to provide a position of the curve and the pixel values are determined based on the position of the curve.

* * * * *